(12) United States Patent
Nagai (10) Patent No.: US 7,693,116 B2
(45) Date of Patent: Apr. 6, 2010

(54) METHOD FOR ASSIGNING TIME SLOTS AND BASE STATION APPARATUS UTILIZING THE SAME

(75) Inventor: Makoto Nagai, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 1083 days.

(21) Appl. No.: 11/297,413

(22) Filed: Dec. 9, 2005

(65) Prior Publication Data

US 2006/0126578 A1 Jun. 15, 2006

(30) Foreign Application Priority Data

Dec. 10, 2004 (JP) ............................. 2004-358972

(51) Int. Cl.
*H04B 7/212* (2006.01)
(52) U.S. Cl. ...................... 370/337; 370/336; 370/329; 370/280; 370/294
(58) Field of Classification Search .................. 370/337, 370/336, 329, 280, 294, 314, 319, 320, 321
See application file for complete search history.

(56) References Cited

U.S. PATENT DOCUMENTS

| | | | |
|---|---|---|---|
| 5,878,034 A * | 3/1999 | Hershey et al. ............. 370/321 |
| 6,400,699 B1 * | 6/2002 | Airy et al. .................... 370/329 |
| 6,567,387 B1 * | 5/2003 | Dulin et al. .................. 370/329 |
| 6,795,413 B1 * | 9/2004 | Uhlik .......................... 370/330 |
| 6,873,607 B1 * | 3/2005 | Hamada et al. .............. 370/321 |
| 6,934,266 B2 * | 8/2005 | Dulin et al. ................ 370/310.1 |
| 2003/0161281 A1 * | 8/2003 | Dulin et al. .................. 370/328 |
| 2004/0224719 A1 * | 11/2004 | Nounin et al. ............. 455/553.1 |
| 2005/0249156 A1 * | 11/2005 | Jelavic et al. ................ 370/329 |

FOREIGN PATENT DOCUMENTS

JP     2002-077980 A     3/2002

* cited by examiner

*Primary Examiner*—Joseph H Feild
*Assistant Examiner*—Huy D Nguyen
(74) *Attorney, Agent, or Firm*—McDermott Will & Emery LLP (57) ABSTRACT

A processing unit performs adaptive array signal processing. A modem unit performs modulation and demodulation processing. A derivation unit derives signal strength as radio communication qualities among a plurality of terminal apparatuses of half rate format. A control unit assigns time slots in a plurality of terminal apparatuses of half rate format to be communicated with a base station apparatus. The control unit selects two terminal apparatuses whose difference between signal strengths is smaller, from among the plurality of terminal apparatuses of half rate, and then assigns time slots, having predetermined relationships, in these selected terminal apparatuses.

13 Claims, 9 Drawing Sheets

| TERMINAL APPARTUS | F/H | FRAME | TIME SLOT | SIGNAL STRENGTH |
|---|---|---|---|---|
| F-1 | F | ODD NUMBERED, EVEN NUMBERED | 1ST TIME SLOT | $A_1$ |
| F-2 | F | ODD NUMBERED, EVEN NUMBERED | 2ND TIME SLOT | $A_2$ |
| H-1 | H | ODD NUMBERED | 1ST TIME SLOT | $A_3$ |
| H-2 | H | EVEN NUMBERED | 1ST TIME SLOT | $A_4$ |

METHOD FOR ASSIGNING TIME SLOTS AND BASE STATION APPARATUS UTILIZING THE SAME

BACKGROUND OF THE INVENTION

1. Field of the Invention

The present invention relates to the time-slot assigning technologies, and it particularly relates to a method for assigning time slots in terminal apparatus to be communicated and also particularly relates to a base station apparatus using said method.

2. Description of the Related Art

In wireless communications, the effective utilization of frequency resources is generally desired. Such needs are all the more growing with the broader use of cellular phone system and second-generation cordless telephone system. One of the technologies meeting such needs is spatial multiplexing. Spatial multiplexing is a technology for communicating with a plurality of terminal apparatuses using the same frequency and the same timing by adjusting the directional pattern of the antennas. In such a spatial multiplexing scheme, signals for a plurality of terminal apparatuses are separated by the directivity pattern of the antennas. And adaptive array antenna technology is used in forming such a directivity pattern.

Generally speaking, adaptive array antenna technology is subject to deterioration of communication quality in two cases as mentioned below due to an insufficient separation among signals for a plurality of terminal apparatuses by an antenna directivity pattern. The first of the cases is where at least two of the terminal apparatuses exist roughly in the same direction. In this case, it becomes difficult to separate signals for the two terminal apparatuses by a difference in the directional pattern. The second of the cases is where the strength ratio between the received signals from at least two of the terminal apparatuses is large to a certain degree. In this case, it becomes difficult to separate signals for the two because the signal strength ratio between the two is larger than the gain ratio of the antennas (See Reference (1) in the following Related Art List, for instance).

RELATED ART LIST (1) Japanese Patent Application Laid-Open No. 2002-77980

In a cellular phone system or second-generation cordless telephony system, one of the techniques for improving the frequency utilization efficiency is the use of a half rate for audio communication calls. For example, in the case of a second-generation cordless telephone system, the base station apparatus carries out voice communication with a terminal apparatus by assigning one of a plurality of time slots included in a frame to the terminal apparatus. Also, by this assignment of a single time slot, the base station apparatus realizes a transmission speed of 32 kbps in relation to the terminal apparatus. The use of a half rate for voice communication calls is equal to halving the transmission speed to 16 kbps. In this case, the base station apparatus assigns one time slot in two frames to the terminal apparatus. As a result, the base station apparatus can assign another of the time slots, which it is primarily supposed to assign to the same terminal apparatus, to another terminal apparatus. As the consequence, the number of terminal apparatuses that can perform audio communication is doubled. The frequency utilization efficiency can be further improved by the use of a quarter rate instead of a half rate.

Under these circumstances, the inventor has come to an understanding as described below. A combination of spatial multiplexing and half-rate coding may effectively improve the frequency utilization efficiency. With such a combination, however, there may be cases where a full-rate terminal apparatus and a half-rate terminal apparatus are subjected to spatial multiplexing in the same time slot. For instance, a base station apparatus may assign one time slot in each frame to a first terminal apparatus in full rate format and may further assign the same time slot alternately to a second terminal apparatus and a third terminal apparatus in half rate format. In this case, the first terminal apparatus and the second terminal apparatus are subjected to spatial multiplexing in a time slot of a given frame and the first terminal apparatus and the third terminal apparatus may be subjected to spatial multiplexing in the time slot of the subsequent frame. And if the base station apparatus cannot separate the signal from the first terminal apparatus and the signal from the third terminal apparatus in this setup, then the communication quality in relation to these terminal apparatuses deteriorates. Moreover, even when spatial multiplexing for the first terminal apparatus and the second terminal apparatus is accomplished, the presence of the third terminal apparatus does not allow the assignment of the first terminal apparatus in full rate format to said time slot, thus rendering the spatial multiplexing using this time slot impossible. As a result, there will be no improvement in frequency utilization efficiency.

SUMMARY OF THE INVENTION

The present invention has been made in view of the foregoing circumstances and an objective thereof is to provide a method for assigning a time slot with reduced adverse effects on terminal apparatuses to be subjected to spatial multiplexing in a given time slot even when the terminal apparatuses to be assigned to the time slot are switched frame by frame and also to provide a base station apparatus utilizing the same.

In order to solve the above problems, a base station apparatus according to a preferred embodiment of the present invention comprises: a communication unit which communicates respectively with a plurality of terminal apparatuses by a plurality of time slots contained in each of frames arranged contiguously; a derivation unit which derives radio communication qualities among the base station apparatus and the plurality of terminal apparatuses, respectively; and an assignment unit which assigns time slots in the plurality of terminal apparatuses, respectively, in such a manner as to assign time slots, contained respectively in different frames among the contiguously arranged frames, in which relative timings in the frames coincide, to at least two terminal apparatuses, whose difference in radio communication quality therebetween is small, among the plurality of terminal apparatuses.

The "radio communication quality" contains the communication quality itself, such as error rates, and factors, such as signal strength and delay spread, that have much effect on the communication quality. "Whose difference in radio communication quality therebetween is small" means any smaller one in at least two differences when the at least two differences in radio communication quality therebetween are compared, and it does necessarily mean the minimum difference in the whole terminal apparatuses.

"Time slots in which relative timings in the frames coincide" means time slots, given the same number, belonging to different frames when the numbers are assigned, to a plurality of time slots contained in a frame, in the ascending order such as "1", "2" and so forth from the beginning. Error may be contained in the timing of the time slots.

According to this embodiment, the time slots in which the timings coincide are assigned to terminal apparatuses whose difference in radio communication quality is small. Therefore, even when another terminal apparatus is assigned by spatial multiplexing to these time slots, the effects produced by the respective terminals assigned to said time slots on the another terminal apparatus can be made equal to each other.

As the radio communication quality the derivation unit may derive the strength of signals received respectively from a plurality of terminal apparatuses. In such a case, the time slots in which the timings coincide are assigned to terminal apparatuses whose difference in signal strength is small. Therefore, even when another terminal apparatus is assigned by spatial multiplexing to these time slots, the effects produced by the respective terminals, whose difference in signal strength is small, on the another terminal apparatus can be made equal to each other.

As the radio communication quality the derivation unit may derive receiving response vectors corresponding respectively to a plurality of terminal apparatuses, based on signals received respectively from the plurality of terminal apparatuses. In such a case, the time slots in which the timings coincide are assigned to terminal apparatuses whose difference in receiving response vector is small. Therefore, even when another terminal apparatus is assigned by spatial multiplexing to these time slots, the effects produced by the respective terminals, whose difference in receiving response vector is small, on the another terminal apparatus can be made equal to each other.

In a case where at least two time slots contained in one frame are assigned respectively to at least two existing terminal apparatuses and new time slots are assigned to a new terminal apparatus, the assignment unit may include: means for selecting an existing terminal apparatus whose difference in radio communication quality between the existing terminal and the new terminal apparatus is smaller, from among the at least two existing terminal apparatuses; and means for assigning the time slots, in which relative timings in the frame coincide, to the time slots assigned in the selected existing terminal apparatuses when time slots contained in a frame different from said frame are assigned to the new terminal apparatus.

In such a case, a new terminal apparatus is assigned to time slots, in a different frame, identical to those assigned to an existing terminal apparatus whose difference in radio communication quality from the new terminal apparatus is smaller. Therefore, the radio communication qualities of said existing terminal apparatus and the new terminal apparatus get closer to each other, and thus the effects thereof on another terminal apparatus can be made equal even when the another terminal apparatus is assigned to these time slots by spatial multiplexing.

In a case where at least two time slots contained in one frame are assigned respectively to at least two existing terminal apparatuses and new time slots are assigned to a new terminal apparatus, if a difference in radio communication quality between the at least two existing terminal apparatuses is smaller than a difference in radio communication quality between the at least two existing terminal apparatuses and the new terminal apparatus, the assignment unit may assign the time slots, contained respectively in different frames, in which relative timings in the frames coincide, to the at least two existing terminal apparatuses and may assign a time slot in a frame that contains time slots assigned to any of the at least two existing terminal apparatuses, to the new terminal apparatus.

In such a case, the reassignment of time slots is performed in a manner such that time slots in which the timings thereof coincide in different frames are assigned respectively to the existing terminal apparatuses whose difference in radio communication quality is small. Therefore, even if another terminal apparatus is assigned by spatial multiplexing to these time slots, the effects thereof on the another terminal apparatus can be made equal.

In a case where time slots, contained respectively in different frames, in which relative timings in the frames coincide, are assigned respectively to at least two existing terminal apparatuses and new time slots are assigned to a new terminal apparatus, if a difference in radio communication quality between any of the at least two existing terminal apparatuses and the new terminal apparatus is smaller than a difference in radio communication quality between the at least two existing terminal apparatuses, the assignment unit may assign the time slots, contained respectively in different frames, in which relative timings in the frames coincide, to any of the at least two existing terminal apparatuses and the new terminal apparatus.

In such a case, if the difference in radio communication quality between any of the existing terminal apparatuses and the new terminal apparatus is small, the reassignment of time slots are performed in a manner such that time slots in which timings coincide in different frames are assigned to these terminal apparatuses. Hence, even if another terminal apparatus is assigned by spatial multiplexing to these time slots, the effects of these terminal apparatuses on the another terminal apparatus can be made equal.

The assignment unit may reassign the time slots, at a predetermined timing, based on the radio communication quality. In this case, even if the radio communication quality varies, the assignment of the corresponding time slots can be carried out.

Another preferred embodiment according to the present invention relates to a time-slot assigning method. This is a method for assigning respectively a plurality of time slots contained respectively in contiguously arranged frames, to a plurality of terminal apparatuses, and the method is characterized in that radio communication qualities among a plurality of terminal apparatuses are derived respectively and time slots are assigned to the plurality of terminal apparatuses, respectively, in such manner that time slots, contained respectively in different frames among the contiguously arranged frames, in which relative timings in the frames coincide are assigned to at least two terminal apparatuses whose difference in radio communication quality therebetween is small.

Still another preferred embodiment according to the present invention relates also to a method for assigning time slots. This method includes: communicating respectively with a plurality of terminal apparatuses by a plurality of time slots contained in each of frames arranged contiguously; deriving radio communication qualities among the plurality of terminal apparatuses, respectively; and assigning time slots to the plurality of terminal apparatuses, respectively, in such a manner as to assign time slots, contained respectively in different frames among the contiguously arranged frames, in which relative timings in the frames coincide, to at least two terminal apparatuses, whose difference in radio communication quality is small, among the plurality of terminal apparatuses.

The deriving may be such that the strength of signals received respectively from a plurality of terminal apparatuses is derived as a radio communication quality. The deriving may be such that, as a radio communication quality, receiving response vectors corresponding respectively to a plurality of terminal apparatuses are derived based on signals received respectively from the plurality of terminal apparatuses.

In a case where at least two time slots contained in one frame are assigned respectively to at least two existing terminal apparatuses and new time slots are assigned to a new terminal apparatus, the assigning may be such that an existing terminal apparatus whose difference in radio communication quality between the existing terminal and the new terminal apparatus is smaller is selected from among the at least two existing terminal apparatuses, and the time slots, in which relative timings in the frame coincide, are assigned to the time slots assigned in the selected existing terminal apparatuses when time slots contained in a frame different from said frame are assigned to the new terminal apparatus.

In a case where at least two time slots contained in one frame are assigned respectively to at least two existing terminal apparatuses and new time slots are assigned to a new terminal apparatus, if a difference in radio communication quality between the at least two existing terminal apparatuses is smaller than a difference in radio communication quality between the at least two existing terminal apparatuses and the new terminal apparatus, the assigning may be such that the time slots, contained respectively in different frames, in which relative timings in the frames coincide, are assigned to the at least two existing terminal apparatuses and a time slot in a frame that contains time slots assigned to any of the at least two existing terminal apparatuses is assigned to the new terminal apparatus.

In a case where time slots, contained respectively in different frames, in which relative timings in the frames coincide, are assigned respectively to at least two existing terminal apparatuses and new time slots are assigned to a new terminal apparatus, if a difference in radio communication quality between any of the at least two existing terminal apparatuses and the new terminal apparatus is smaller than a difference in radio communication quality between the at least two existing terminal apparatuses, the assigning may be such that the time slots, contained respectively in different frames, in which relative timings in the frames coincide, are assigned to any of the at least two existing terminal apparatuses and the new terminal apparatus. The assigning may be such that the assignment of time slots are performed again, at a predetermined timing, based on the radio communication quality.

Still another preferred embodiment according to the present invention relates to a program. This program is executable by a computer, and the program includes the functions of: communicating respectively with a plurality of terminal apparatuses by a plurality of time slots contained in each of frames arranged contiguously, via a radio network; deriving radio communication qualities of communication network among the plurality of terminal apparatuses, respectively; and assigning time slots to the plurality of terminal apparatuses, respectively, in such a manner as to assign time slots, contained respectively in different frames among the contiguously arranged frames, in which relative timings in the frames coincide, to at least two terminal apparatuses, whose difference in radio communication quality is small, among the plurality of terminal apparatuses, and storing a result thereof.

In the deriving, the strength of signals received respectively from a plurality of terminal apparatuses may be derived as a radio communication quality. In the deriving, receiving response vectors corresponding respectively to a plurality of terminal apparatuses are derived, as a radio communication quality, based on signals received respectively from the plurality of terminal apparatuses.

In a case where at least two time slots contained in one frame are assigned respectively to at least two existing terminal apparatuses and new time slots are assigned to a new terminal apparatus, the storing may be such that an existing terminal apparatus whose difference in radio communication quality between the existing terminal and the new terminal apparatus is smaller is selected from among the at least two existing terminal apparatuses, and the time slots, in which relative timings in the frame coincide, are assigned to the time slots assigned in the selected existing terminal apparatuses when time slots contained in a frame different from said frame are assigned to the new terminal apparatus.

In a case where at least two time slots contained in one frame are assigned respectively to at least two existing terminal apparatuses and new time slots are assigned to a new terminal apparatus, if a difference in radio communication quality between the at least two existing terminal apparatuses is smaller than a difference in radio communication quality between the at least two existing terminal apparatuses and the new terminal apparatus, the time slots, contained respectively in different frames, in which relative timings in the frames coincide, may be assigned to the at least two existing terminal apparatuses and a time slot in a frame that contains time slots assigned to any of the at least two existing terminal apparatuses is assigned to the new terminal apparatus, in the storing.

In a case where time slots, contained respectively in different frames, in which relative timings in the frames coincide, are assigned respectively to at least two existing terminal apparatuses and new time slots are assigned to a new terminal apparatus, if a difference in radio communication quality between any of the at least two existing terminal apparatuses and the new terminal apparatus is smaller than a difference in radio communication quality between the at least two existing terminal apparatuses, the time slots, contained respectively in different frames, in which relative timings in the frames coincide, may be assigned to any of the at least two existing terminal apparatuses and the new terminal apparatus, in the storing. The assigning and storing may be such that the assignment of time slots are performed again, at a predetermined timing, based on the radio communication quality.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Before describing the present invention in detail, an outline of the present invention will be described first. A preferred embodiment of the invention relates to a base station apparatus that connects with a plurality of terminal apparatuses by TDMA (Time Division Multiple Access) as in a second-generation cordless telephone system. One frame in a second-generation cordless telephony system is made up of eight time slots, and frames are arranged consecutively. And a data rate of 32 kbps is realized by assigning a time slot in each frame to one terminal apparatus. Note that if the uplink and downlink are taken into consideration, two time slots in each frame are assigned to one terminal apparatus. Furthermore, in order to realize a half-rate format, one time slot in every two frames is assigned to one terminal apparatus. As a result, a data rate of 16 kbps is realized. Note that the aforementioned 32 kbps is called a "full rate" in relation to a "half rate".

A base station apparatus according to an embodiment of the invention further assigns a plurality of terminal apparatuses to a single time slot by applying SDMA (Space Division Multiple Access). In such an arrangement, there may be cases where a half-rate terminal apparatus and a full-rate terminal apparatus are assigned to a single time slot. As a result, a full-rate terminal apparatus is subjected to spatial multiplexing with a first half-rate terminal apparatus in a time slot in a predetermined frame and to spatial multiplexing with a second half-rate terminal apparatus in a time slot in another frame. Consequently, the signal transmitted by the first half-rate terminal apparatus and the signal transmitted by the second half-rate terminal apparatus give adverse effects on the transmission quality of the full-rate terminal apparatus. For example, the worsening of the transmission quality of the full-rate terminal apparatus by the signal transmitted by the first half-rate terminal apparatus leads to an overall drop in the transmission quality of the full-rate terminal apparatus even if there is no worsening of the transmission quality of the full-rate terminal apparatus by the signal transmitted by the second half-rate terminal apparatus.

A base station apparatus according to a preferred embodiment assigns two terminal apparatuses for which the difference in signal strength is small, out of a plurality of half-rate terminal apparatuses, to identical time slots in different frames. As a result, the first half-rate terminal apparatus and the second half-rate terminal apparatus which are both assigned to the same time slot as the full-rate terminal apparatus have signal strengths close to each other. That is, it is possible to make equal the effects produced by the signals transmitted from these half-rate terminal apparatuses on the transmission quality of the full-rate terminal. Hence, it is possible to reduce the cases where the transmission quality as a whole of the full-rate terminal apparatus is worsened solely by the signal transmitted from the first half-rate terminal.

Figure 1:
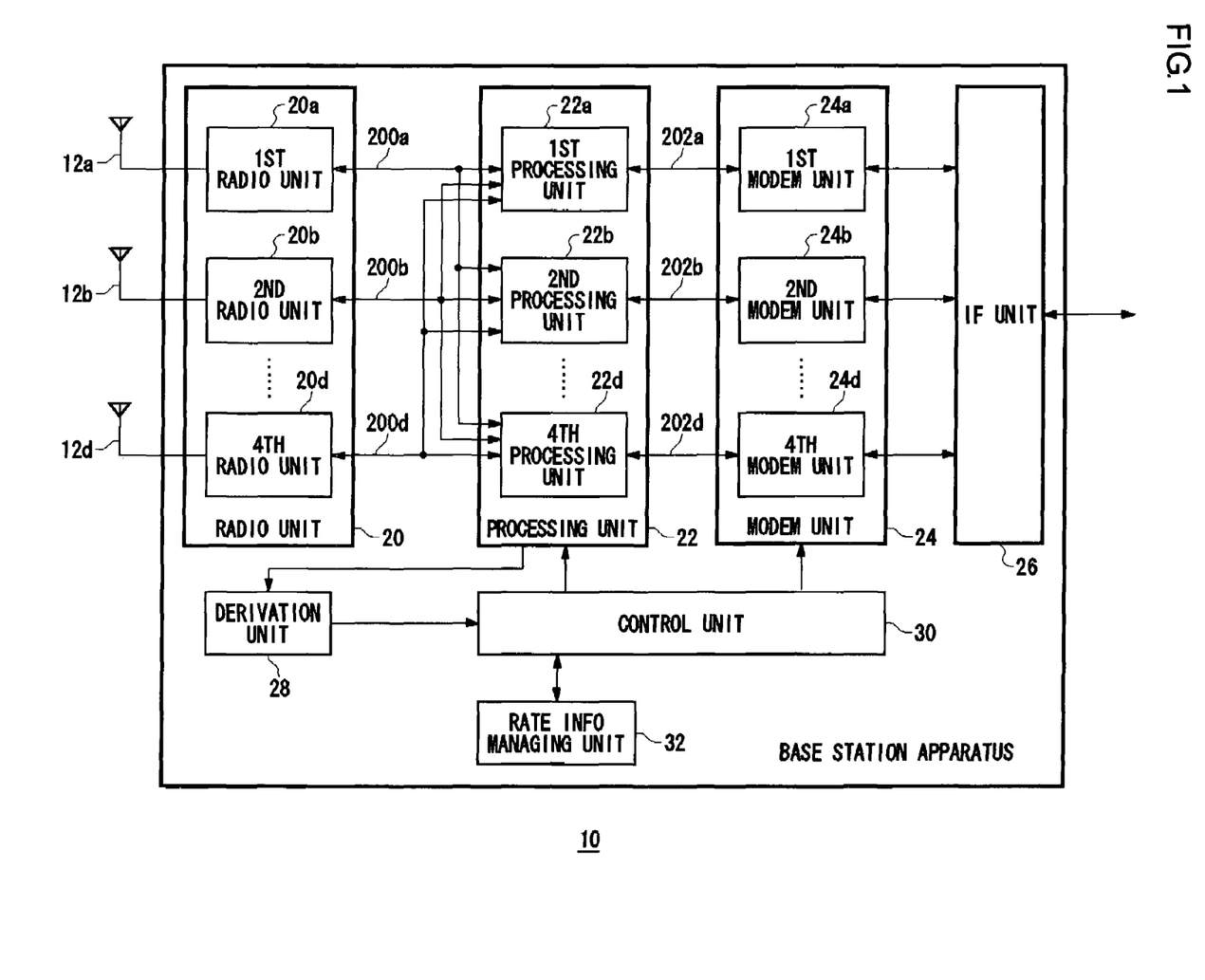
FIG. 1 illustrates a structure of a base station apparatus according to an embodiment of the present invention.

FIG. 1 illustrates a structure of a base station apparatus 10 according to an embodiment of the present invention. The base station apparatus 10 includes a first antenna 12a, a second antenna 12b, . . . and a fourth antenna 12d, which are generically referred to as "antenna 12", a first radio unit 20a, a second radio unit 20b, . . . and a fourth radio unit 20d, which are generically referred to as "radio unit 20", a first processing unit 22a, a second processing unit 22b, . . . and a fourth radio 22d, which are generically referred to as "processing unit 22", a first modem unit 24a, a second modem unit 24b, . . . and a fourth modem unit 24d, which are generically referred to as "modem unit 24", an IF unit 26, a derivation unit 28, a control unit 30 and a rate information managing unit 32. Signals involved include a first radio-unit-side signal 200a, a second radio-unit-side signal 200b, . . . and a fourth radio-unit-side signal 200d, which are generically referred to as "radio-unit-side signal 200", and a first modem-side signal 202a, a second modem-side signal 202b, . . . and a fourth modem-side signal 202d, which are generically referred to as "modem-side signal 202".

As a receiving operation, the antenna 12 receives radiofrequency signals from terminal apparatus, not shown here. As a transmission operation, the antenna 12 transmits radiofrequency signals to terminal apparatuses, not shown here. The timing for the receiving operation and transmission operation is controlled by the control unit 30 described later. The antenna 12 is compatible with the adaptive array antenna technique, and the directivity of antennas is controlled by the processing unit 22 described later. Though it is assumed herein that the number of antenna 12 is "4", it may be other than "4".

As a receiving operation, the radio unit 20 carries out frequency conversion of received radiofrequency signal received by the antennas 12 so as to derive baseband signals. The radio unit 20 outputs the baseband signals to the processing unit 22 as the radio-unit-side signals 200. The baseband signal, which is composed of in-phase components and quadrature components, shall generally be transmitted by two signal lines. For the clarity of figure, the signal is presented here by a single signal line. An AGC unit and/or an A-D conversion unit are also included. As a transmission operation, the radio unit 20 carries out frequency conversion of baseband signals from the processing unit 22 so as to derive radiofrequency signals. Here, the baseband signals from the processing unit 22 are also indicated as the radio-unit-side signals 200. The radio unit 20 outputs the radiofrequency signals to the antenna 12.

As a receiving operation, the processing unit 22 performs adaptive array signal processing on a plurality of radio-unit-side signals 200. Then the processing unit 22 outputs the result of adaptive array signal processing as the modem-side signals 202. One modem-side signal 202 corresponds to a multiplexed signal corresponding to one of a plurality of terminal apparatuses. As a transmission operation, the processing unit 22 performs adaptive array signal processing on the modem-side signals 202 inputted from the modem unit 24. Then the processing unit 22 outputs the signals that have undergone the adaptive array signal processing, as the radio-unit-side signals 200.

As a receiving processing, the modem unit 24 demodulates the modem-side signal 202 outputted from the baseband processing unit 22. The modem unit 24 outputs the demodulated signal to the IF unit 26. As a transmission processing, the modem unit 24 carries out modulation. The modem unit 24 outputs the modulated signal to the baseband processing unit 22 as a modem-side signal 202. The modulation scheme used is π/4 shift QPSK (Quadrature Phase Shift Keying) which is compatible with the second-generation cordless telephony system. The demodulation is performed using the differential detection.

The IF unit 26 is connected to a network which is not shown here, and as a receiving processing the IF unit 26 outputs the signals demodulated by the modem unit 24 to the network which is not shown here. As a transmission processing, the IF unit 26 inputs data from the network and then outputs the data to the modem unit 24. As described above, the antenna 12, radio unit 20, processing unit 22 and modem unit 24 achieves communication with a plurality of terminal apparatuses, which are not shown here. To achieve the communication, a plurality of time slots contained in each of frames arranged contiguously are used. The detail will be discussed later.

The derivation unit 28 derives radio communication qualities for a plurality of terminal apparatuses, respectively. Here, the strength of signals received from a plurality of terminal apparatuses is derived. As described above, since SDMA is employed, the radiofrequency signal and the radio-unit-side signal 200 contain signals, outputted from a plurality of terminal apparatuses, which are assigned in one time slot. Thus, the derivation unit 28 derives the signal strength, based on receiving weight vectors derived from the first processing unit 22a to fourth processing unit 22d, respectively. This is because the respective receiving weight vectors are so computed as to correspond respectively to a plurality of terminal apparatuses. The derivation unit 28 derives the strength of a signal corresponding to a terminal apparatus by multiplying each component of a receiving weight vector corresponding to said terminal apparatus. If SDMA is not executed, the derivation unit 28 may derive the signal strength from the radiofrequency signals and/or the radio-unit-side signals 200.

Figure 2:
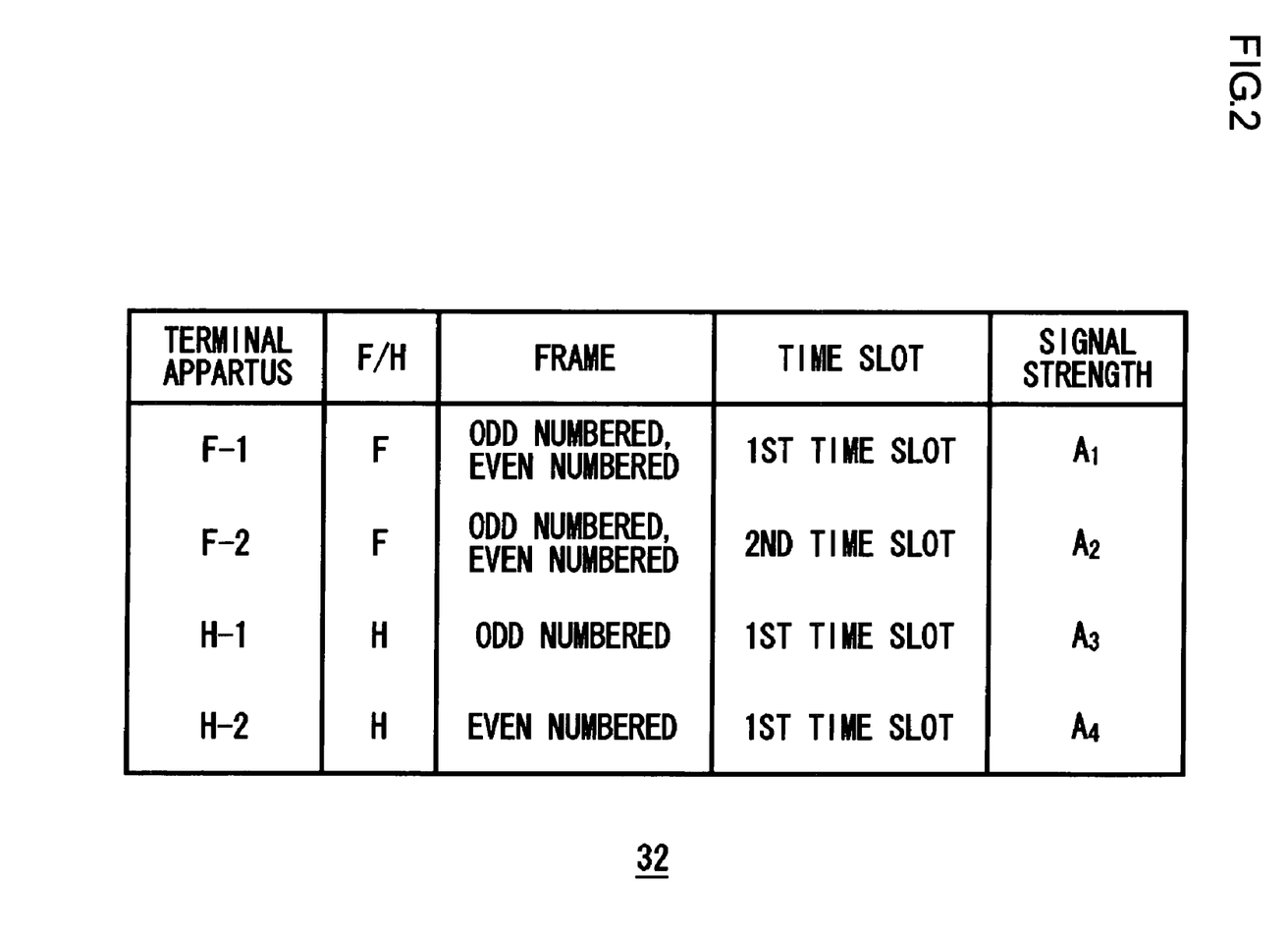
FIG. 2 illustrates a structure of data managed by a rate information managing unit shown in FIG. 1.

The control unit 30 assigns radio channels to a plurality of terminal apparatuses to be communicated with the base station apparatus 10. The control unit 30 controls the timing of component parts included in the base station apparatus 10. Since in TDMA the time slots are assigned for the terminal apparatus to communicate with the terminal apparatus, the radio channels correspond to the time slots. Here, SDMA is to be implemented in addition to TDMA, so that a plurality of channels are assigned for each time slot. Hence, a plurality of terminal apparatuses are assigned for each time slot. When assigning the time slots, the control unit 30 refers to data managed by the rate information managing unit 32. FIG. 2 illustrates a structure of data managed by the rate information managing unit 32. The "terminal apparatus" in FIG. 2 is a terminal apparatus which is being currently connected. Herein, a terminal apparatus of full rate is denoted by "F" whereas a terminal apparatus of half rate is denoted by "H". The number following the "F" and "H" denotes the identification number of a terminal apparatus. Accordingly, "F-1" corresponds to a first full-rate terminal apparatus. These indications are given to clarify explanation but the ID numbers other than these may be given in the actual setting.

"F/H" in FIG. 2 indicates the type of rate in use, that is, either "full rate" or "half rate". "Frame" in FIG. 2 indicates frames including time slots assigned in a terminal apparatus. Since the frame rate is in question, the frame is classified into two types which are the "odd numbered" frame and "even numbered" frame. Frames are given predetermined numbers. "Time slot" in FIG. 2 indicates a time slot assigned to a terminal apparatus. As described earlier, each frame contains eight time slots. These eight time slots are assigned in a manner that four timeslots are each assigned for uplink and downlink in the terminal apparatus. Here, the four time slots are placed in the beginning of a frame in the order of a first time slot, a second time slot, a third time slot and a fourth time slot. Thus, even in different frames the first time slots mutually coincide in relative timing within a frame. "Signal strength" in FIG. 2 indicates the strength of a signal derived by the derivation unit 28.

Figure 3:
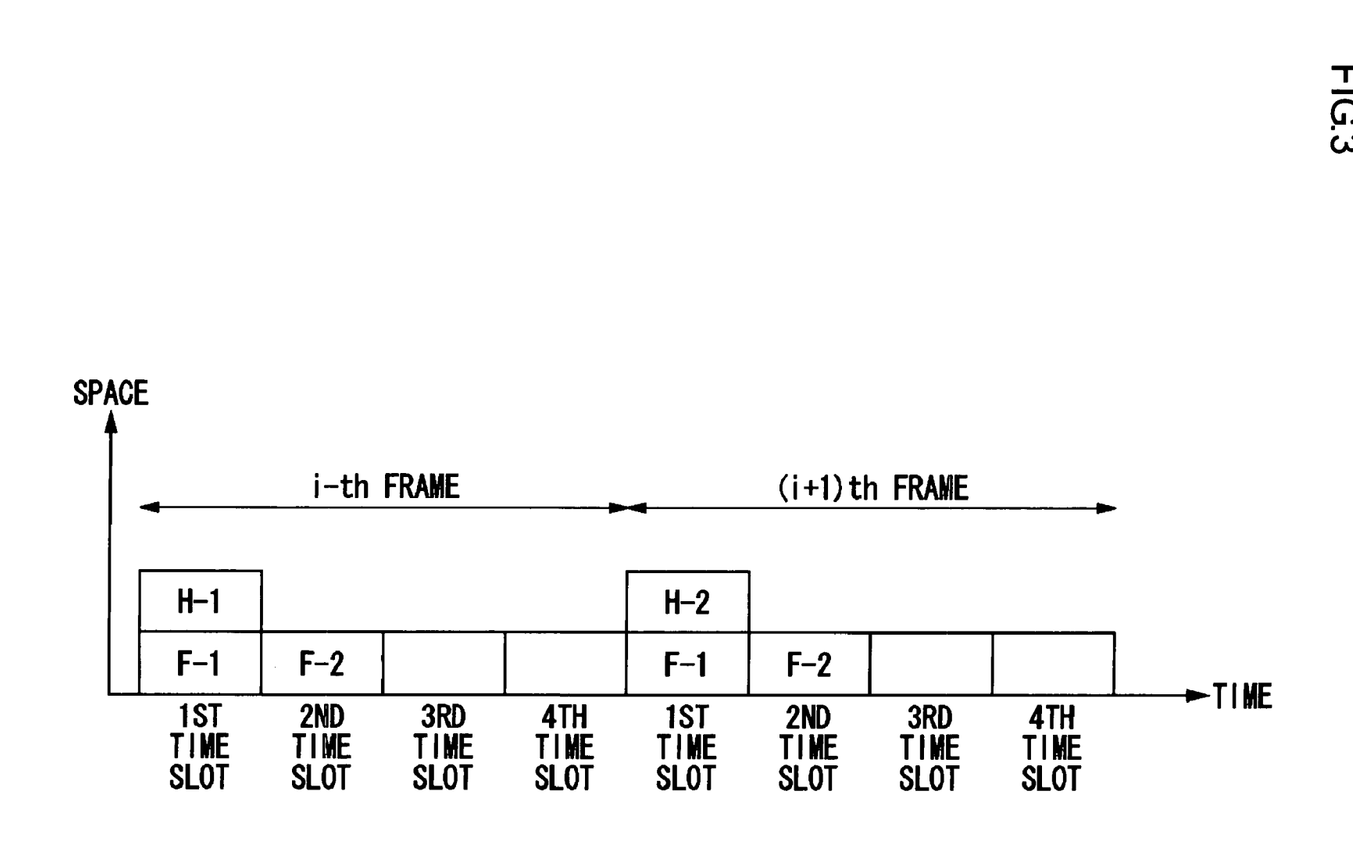
FIG. 3 illustrates a structure of frames realized by a control unit shown in FIG. 1.

FIG. 3 illustrates a structure of frames realized by the control unit 30. FIG. 3 corresponds to a case where the control unit 30 has assigned time slots to a plurality of terminal apparatuses, based on the data of FIG. 2 managed by the rate information managing unit 32. In FIG. 3, the arrangement of time slots on the time axis is indicated in the horizontal axis direction whereas the arrangement of radio channels on the space axis is indicated in the vertical axis direction. That is, the horizontal axis corresponds to TDMA whereas the vertical axis corresponds to SDMA. Two consecutive frames are shown as "i-th frame" and "(i+1)th frame" in FIG. 3. Each of the "i-th frame" and the "(i+1)th frame" contains "first time slot" to "fourth time slot". Since either uplink only or downlink only is shown here, the number of time slots contained in one frame is "4" here, there are "8" time slots contained in the actual setting. Hence, one frame contains also "fifth time slot" to "eighth time slot".

However, the time slots in the uplink is generally related to those of downlink in a one-to-one correspondence manner in order that the "fifth time slot" can also be assigned to the terminal apparatus to which the "first time slot" has been assigned. As shown in FIG. 3, description will be given of the "four" time slots only. The control unit 30 assigns "F-1" to the "first time slot" of each of the "i-th frame" and "(i+1)th frame", and assigns "F-2" to the "second time slot" of each of the "i-th frame" and "(i+1)th frame". The control unit 30 assigns "H-1" and "H-2" alternately for each frame. Thus, the control unit 30 subjects "H-1" and "F-1" to spatial multiplexing in the "i-th frame", and subjects "H-2" and "F-1" to spatial multiplexing in the "(i+1)th frame". As described earlier, the transmission quality of "F-1" is influenced by the signals from "H-1" and those from "H-2."

Refer back to FIG. 1. When the control unit 30 assigns time slots to a terminal apparatus of half rate, the control unit 30 operates as follows. That is, the control unit 30 selects, from among a plurality of half-rate terminal terminals, two terminal apparatuses whose difference in signal strength is small, and then assigns time slots having a predetermined relationship to these selected terminal apparatuses. That the difference in signal strength is small may indicate a case where the difference is relatively small compared to other differences, and is not necessarily the case where the difference is the minimum. The time slots having a predetermined relationship are those contained respectively in different frames among the contiguously arranged frames, in which relative timings in frames coincide. This is equivalent to the relationship between the "first time slot" of "i-th frame" and the "first time slot" of the "(i+1)th frame". That is, these are time slots assigned to the full-rate terminal apparatuses. The control unit 30 uses the signal strength managed by the rate information managing unit 32. To derive differences among the signal strengths, the control unit 30 performs subtraction on among the half-rate terminal apparatuses. Instead of performing subtraction, the ratios among the signal strengths may be calculated by division and this calculation result may be regarded as differences among the signal strengths.

Under the aforementioned rule, the operation of the control unit 30 will now be described in more detail. In what is to follow, it is assumed that a terminal apparatus means a terminal apparatus of half rate. First, assumed is a case where the control unit 30 assigns to two existing terminals (hereinafter referred to as "H-1" and "H-2") at least two time slots contained in a frame, assigns a new terminal apparatus (hereinafter referred to as "H-3") a new time slot. This corresponds to a case where "H-1" and "H-2" are assigned to the "first time slot" and "second time slot" in the i-th frame of FIG. 3, respectively.

The control unit 30 derives differences in signal strength from among "H-1" to "H-3" managed by the rate information managing unit 32, respectively. If the difference between "H-1" and "H-2" is not the minimum, the control unit 30 calculates differences in signal strength between "H-1" and "H-3" and between "H-1" and "H-3" and selects the difference whichever is smaller. When assigning time slots contained in the (i+1)th frame to "H-3", time slots in which relative timings in the frame coincide are assigned to the time slots which have been assigned to the selected existing terminal apparatus. For example, when "H-1" is selected, H-3 is assigned to the "first time slot" in the (i+1)th frame.

If the difference between "H-1" and "H-2" is smaller than the difference between "H-1" and "H-3" or the difference between "H-2" and "H-3", the control unit 30 assigns time slots, contained respectively in different frames, in which relative timings in the frames coincide, to "H-1" and "H-2". That is, the time slots currently in use are used intact. For example, "H-1" and "H-2" are assigned to the "first time slot" in the i-th frame and the "first time slot" in the (i+1)th frame, respectively. The control unit 30 assigns time slots in a frame containing the time slots which have been assigned to either "H-1" or "H-2", to "H-3". For example, "H-3" is assigned to the "second time slot" in the i-th frame. In the above explanation, the procedure for assigning time slots or the procedure for changing the time slots among the terminal apparatuses may be the same as the procedure employed in the second-generation cordless telephone system, the repeated description thereof is omitted here. The procedure for changing the time slots is equivalent to switching channels.

Next, assumed is a case where time slots, contained respectively in different frames, in which relative timings in the frames coincide, are assigned respectively to "H-1" and "H-2" by the control unit 30 and then new time slots are assigned to "H-3". This corresponds to a case where "H-1" and "H-2" are assigned to the "first time slot" in the i-th frame and the "first time slot" in the (i+1)th frame, respectively. If the difference in signal strength between "H-1" and "H-3" or between "H-2" and "H-3" is smaller than the difference in signal strength between "H-1" and "H-2", then the control unit 30 will assign time slots, contained in different frames, in which the relative timings in the frames coincide, to either "H-1" or "H-2" and "H-3". For example, "H-1" and "H-3" are assigned to the "first time slot" in the i-th frame and the "first time slot" in the (i+1)th frame, respectively. In this case, "H-1" is assigned to the "second time slot" in the i-th frame.

In the above description, when assigning time slots to a new terminal apparatus, the control unit 30 performs reassignment of time slots. However, the control unit 30 may perform the reassignment of time slots in other instances. In such a case, the reassignment is performed based on the signal strength for the terminal apparatus, the same way as the above. The reassignment may be performed on the periodic timing. For example, it is done whenever a traffic amount is assumed to be low.

In terms of hardware, the above-described structure can be realized by a CPU, a memory and other LSIs of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

Figure 4:
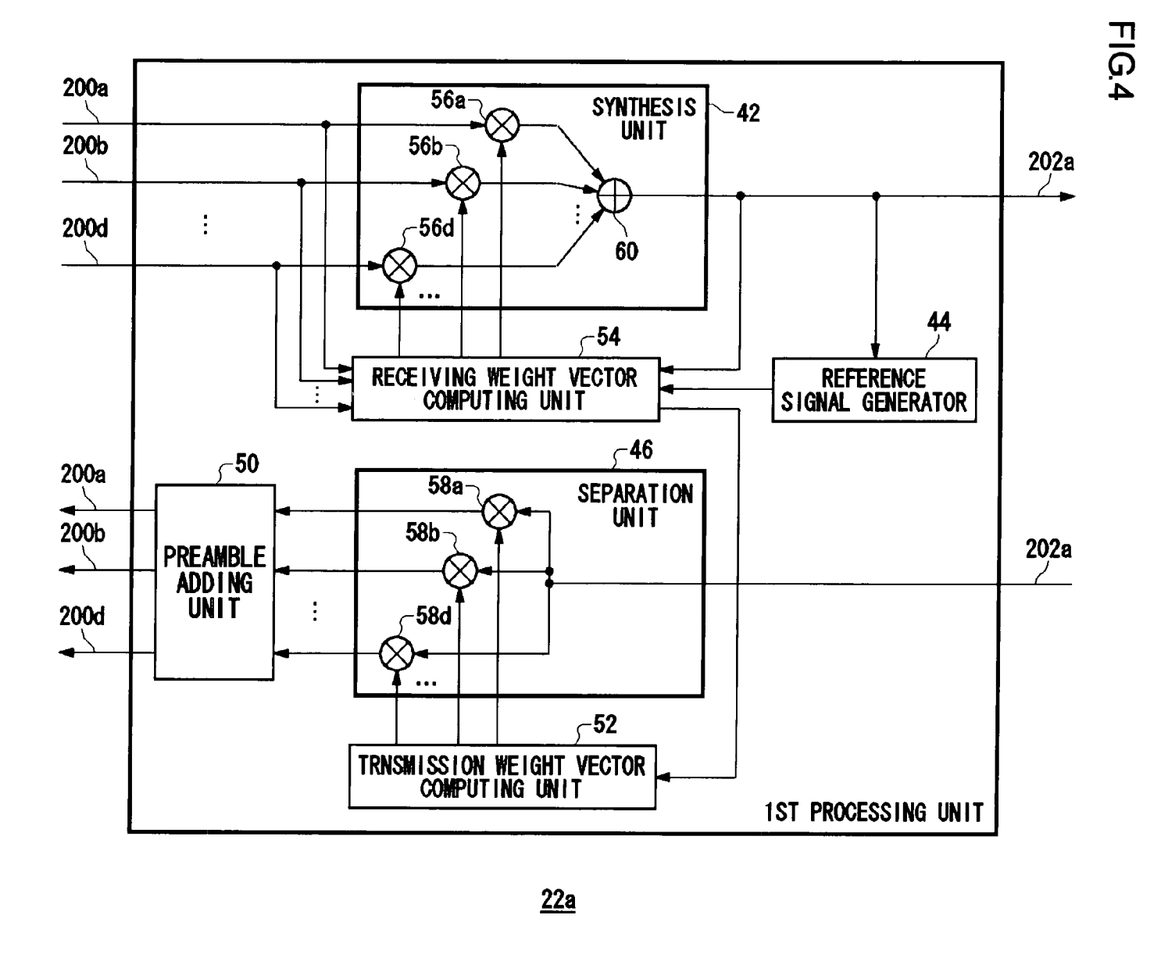
FIG. 4 illustrates a structure of a first processing unit shown in FIG. 1.

FIG. 4 illustrates a structure of the first processing unit 22a. The first processing unit 22a includes a synthesis unit 42, a reference signal generator 44, a weight vector computing unit 54, a separation unit 46, a transmission weight vector computing unit 52 and a preamble adding unit 50. The synthesis unit 42 includes a first multiplier 56a, a second multiplier 56b, . . . and a fourth multiplier 56d, which are generically referred to as multipliers 56, and an adder 60. The separation unit 46 includes a first multiplier 58a, a second multiplier 58b, . . . and a fourth multiplier 58d, which are generically referred to as multipliers 58.

The multipliers 56 weight the radio-unit-side signals 200 respectively with the receiving weight vectors from the receiving weight vector computing unit 54. The adder 60 sums up the outputs of the multipliers 56. Here, the summed-up signal is denoted as the modem-side signal 202. The processing in the multipliers 56 and the adder 60 corresponds to the combining in which the weighting is being performed.

During a training signal period, the reference signal generator 70 outputs a training signal stored in advance as a reference signal. In times other than these training signal periods, a modem-side signal 202 is determined by a prescribed threshold value. The decision may not necessarily be a hard decision but it may also be a soft decision. As shown in FIG. 3, the communication with the terminal apparatus is carried out in predetermined time slots here. Thus, the communication is executed using burst signals. In the second-generation cordless telephony system, a preamble is placed in the beginning of a burst signal. Since the preamble is a known signal, it corresponds to a training signal.

The receiving weight vector computing unit 54 derives receiving weight vectors, based on the radio-unit-side signal 200, modem-side signal 202 and reference signal. A method for deriving the receiving weight vectors may be arbitrary and, for example, the receiving weight vector is derived by using the LMS (Least Mean Square) algorithm.

The transmission weight vector computing unit 52 estimates a transmission weight vector necessary for weighting the modem-side signal 202, from the receiving weight vector. The method for estimating the transmission weight vector may be arbitrary. As a most simple method therefor, however, the receiving weight vector may be used intact. As another method, the receiving weight vector may be corrected using a conventional technique while the Doppler frequency variation of a propagation environment caused by the time difference between a receiving processing and a transmission processing is taken into account. It is assumed herein that as the transmission weight vector the receiving weight vector is used intact.

The multipliers 58 weight the modem-side signal 202 with the transmission weight vectors respectively so as to output the result thereof to the preamble adding unit 50. The preamble adding unit 50 adds a preamble in the beginning of a burst signal. The above-described operation is controlled by the control unit 30 of FIG. 1. In FIG. 4, the first radio-unit-side signal 200a or the like appears twice in FIG. 4. These are the signal in one direction and these correspond to the first radio-unit-side signal 200a or the like which is a bidirectional signal shown in FIG. 1.

Figure 5:
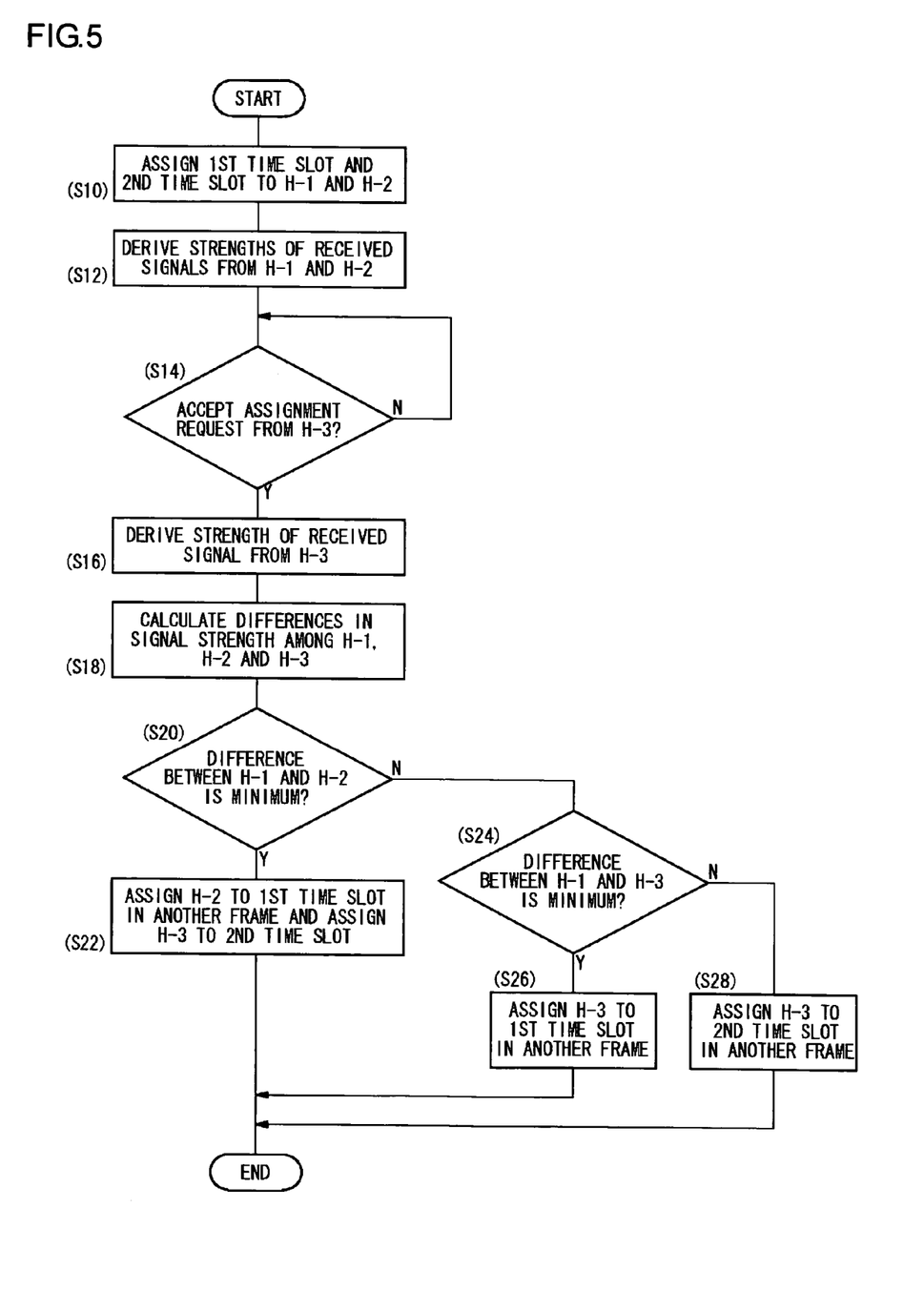
FIG. 5 is a flowchart showing a procedure of assigning time slots by the control unit of FIG. 1.
Figure 6A:
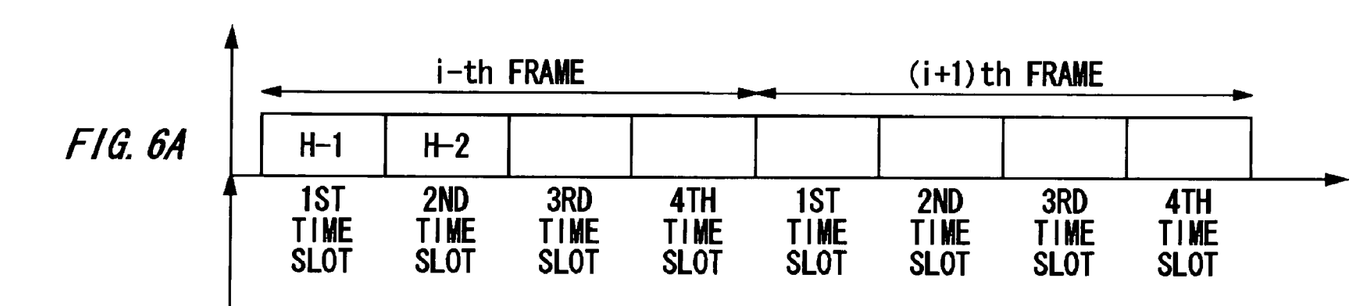
FIGS. 6A to 6C illustrate structures of frames corresponding to the flowchart shown in FIG. 5.

An operation of a base station apparatus 10 structured as above will now be explained. FIG. 5 is a flowchart showing a procedure for assigning time slots by the control unit 30. The control unit 30 assigns the first time slot and the second time slot contained in the i-th frame to "H-1" and "H-2", respectively (S10). FIG. 6A shows a structure of frames corresponding to Step 10 of the flowchart shown in FIG. 5. FIG. 6A is so illustrated as to correspond to FIG. 3, and the description thereof is omitted here. Referring back to FIG. 5, the derivation unit 28 derives the strengths of received signals from "H-1" and "H-2", respectively (S12). If the control unit 30 does not accept an assignment request from the new "H-3" (N of S14), it keeps the situation intact. If the control unit 30 accepts the assignment request from the new "H-3" (Y of S14), the derivation unit 28 derives the strength of received signal from "H-3" (S16). The control unit 30 calculates differences in signal strength among "H-1", "H-2" and "H-3" (S18).

Figure 6B:
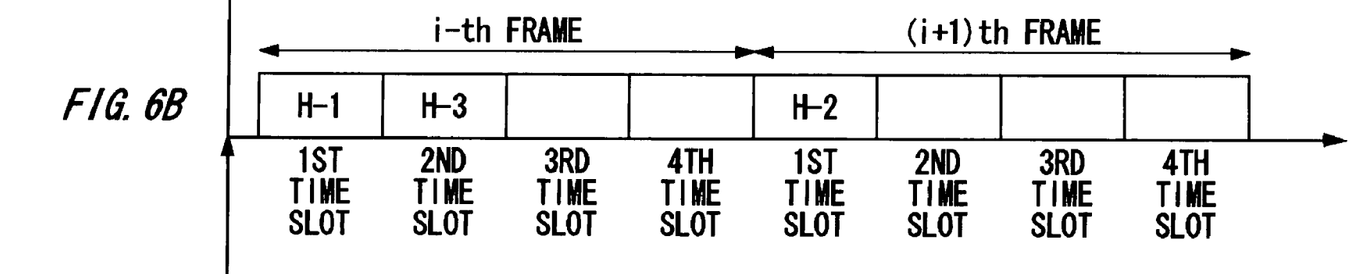

If the difference in signal strength between "H-1" and "H-2" is minimum (Y of S20), the control unit 30 assigns "H-2" to the first time slot in another frame, namely, the (i+1)th frame and assigns "H-3" to the second time slot in the i-th frame (S22). FIG. 6B shows a structure of frames corresponding to Step 22 shown in FIG. 5. "H-1" and "H-2", whose difference therebetween is small, are assigned to the time slots in which relative timings in different frames coincide. As a result, when the time slot where "H-1" is assigned is combined with the time slot where "H-2" is assigned, the thus combined time slots are equivalent to the time slot of full frame. Now, refer back to FIG. 5.

Figure 6C:
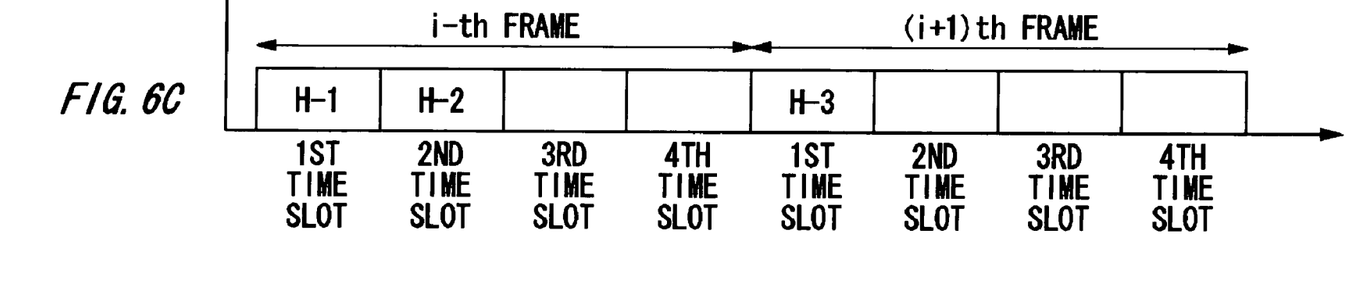

If, on the other hand, the difference in signal strength between "H-1" and "H-2" is not minimum (N of S20) and the difference in signal strength between "H-1" and "H-3" is minimum (Y of S24), the control unit 30 assigns "H-3" to the first time slot in another frame, namely, the (i+1)th frame (S26). FIG. 6C shows a structure of frames corresponding to Step 26 shown in FIG. 5. "H-1" and "H-3", whose difference therebetween is small, are assigned to the time slots in which relative timings in different frames coincide. As a result, when the time slot where "H-1" is assigned is combined with the time slot where "H-3" is assigned, the thus combined time slots are equivalent to the time slot of full frame. Now, refer back to FIG. 5. If the difference in signal strength between "H-1" and "H-3" is not minimum (N of S24), the control unit 30 assigns "H-3" to the second time slot in another frame, namely, the (i+1)th frame (S28).

Figure 7:
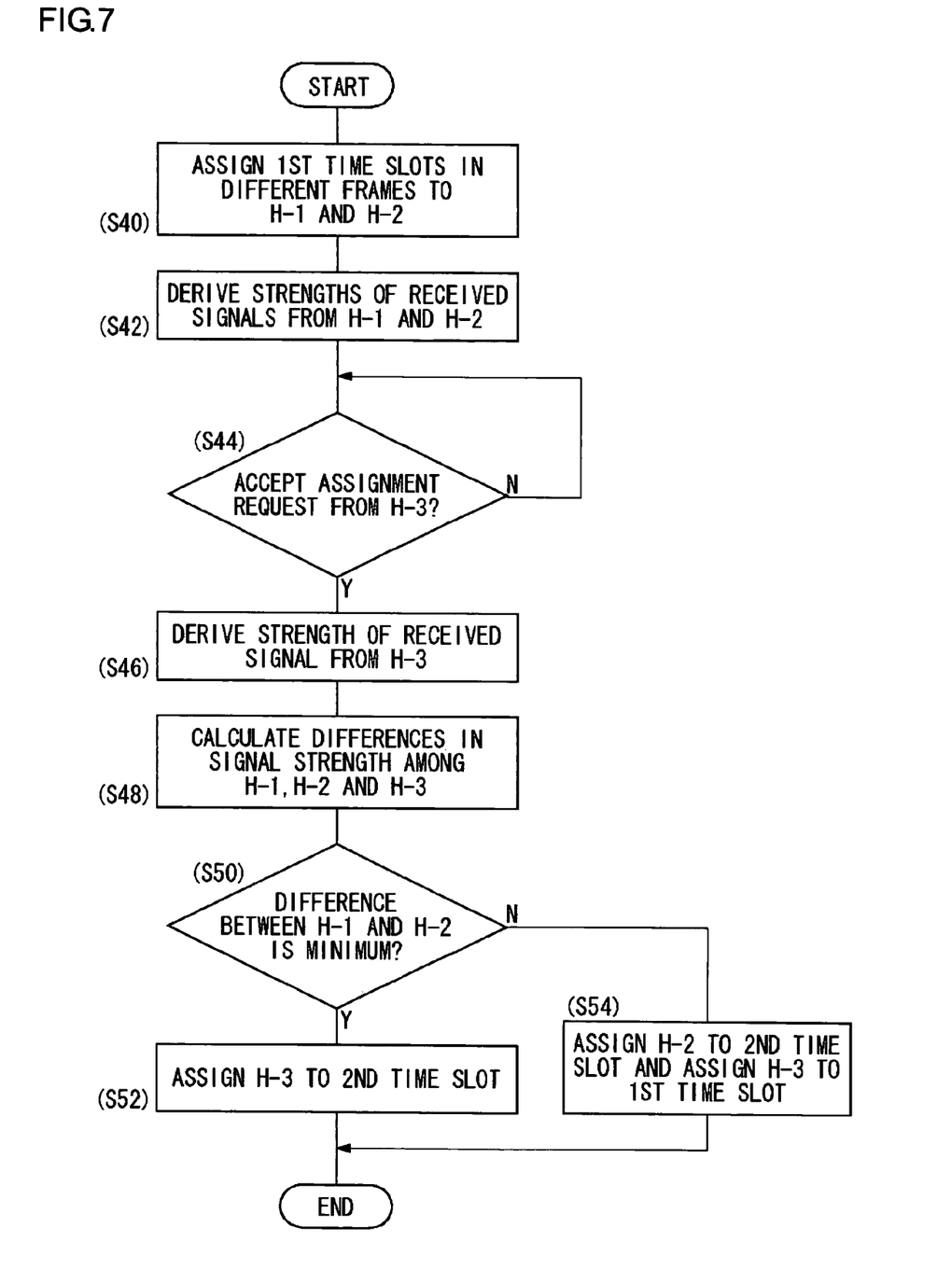
FIG. 7 is a flowchart showing another procedure of assigning time slots by the control unit of FIG. 1.
Figure 8A:
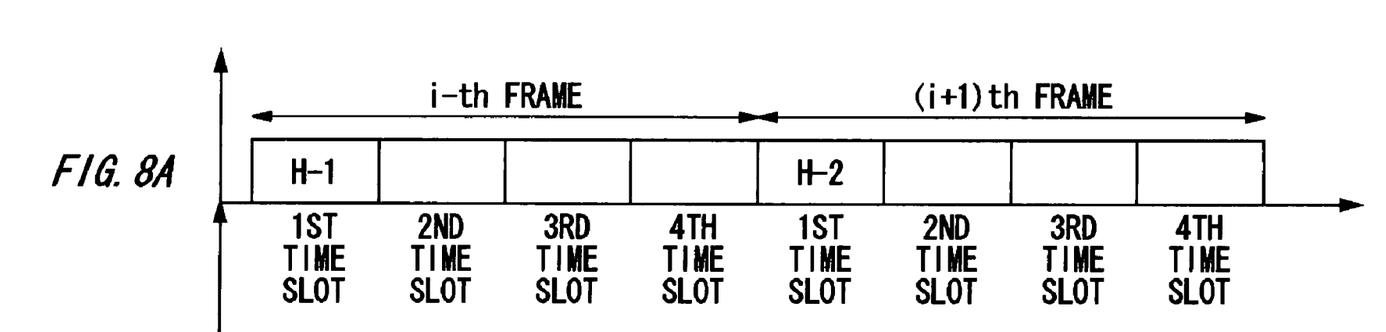
FIGS. 8A to 8C illustrates structures of frames corresponding to the flowchart shown in FIG. 7.

FIG. 7 is a flowchart showing another procedure for assigning time slots by the control unit 30. Compared with FIG. 5, the time slots, in which "H-1" and "H-2" are assigned at the initial condition, differ in FIG. 7. The control unit 30 assigns the first time slots contained in another frames, namely, the i-th frame and the (i+1)th frame, respectively, to "H-1" and "H-2" (S40). FIG. 8A shows a structure of frames corresponding to Step 40 of the flowchart shown in FIG. 7. FIG. 8A is so illustrated as to correspond to FIG. 3, and the description thereof is omitted here. Referring back to FIG. 7, the derivation unit 28 derives the strengths of received signals from "H-1" and "H-2", respectively (S42). If the control unit 30 does not accept an assignment request from the new "H-3" (N of S44), it keeps the situation intact. If the control unit 30 accepts the assignment request from the new "H-3" (Y of S44), the derivation unit 28 derives the strength of received signal from "H-3" (S46). The control unit 30 calculates differences in signal strength among "H-1", "H-2" and "H-3" (S48).

Figure 8B:
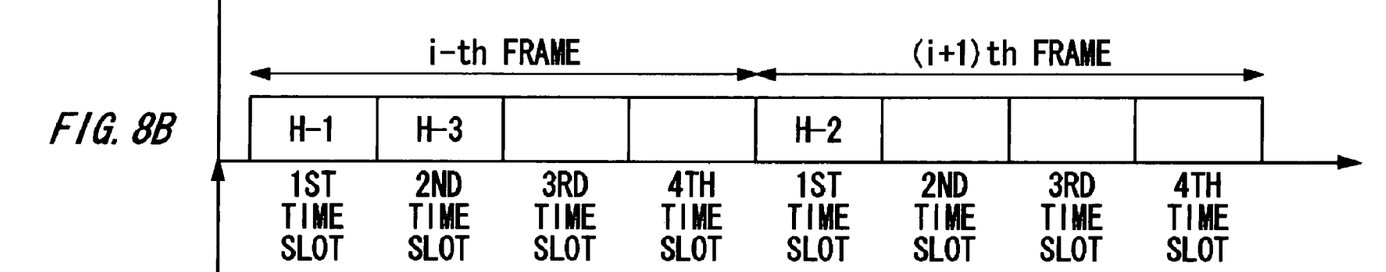
Figure 8C:
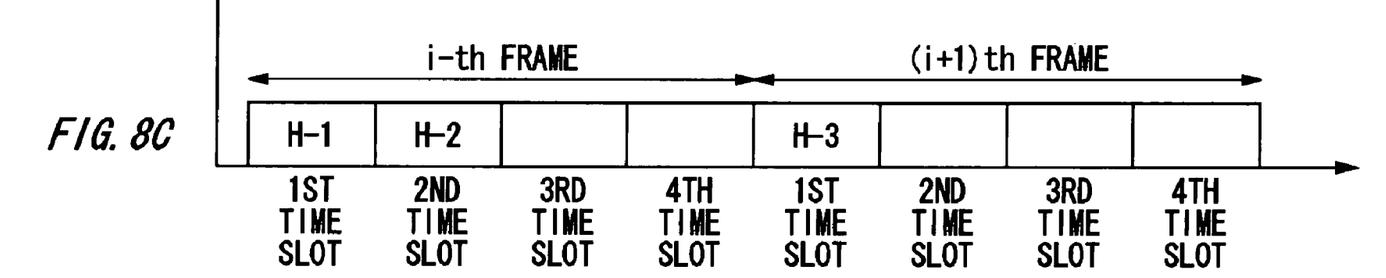

If the difference in signal strength between "H-1" and "H-2" is minimum (Y of S50), the control unit 30 assigns "H-3" to the second time slot in the i-th frame (S52). FIG. 8B shows a structure of frames corresponding to Step 52 shown in FIG. 7. The relationship between the time slots assigned to "H-1" and "H-2" is the same as that shown in FIG. 8A. Refer back to FIG. 7. If, on the other hand, the difference in signal strength between "H-1" and "H-2" is not minimum (N of S50), the control unit 30 assigns "H-2" to the second time slot in the i-th frame and assigns "H-3" to the first time slot in another frame, namely, the (i+1)th frame (S54). FIG. 8C shows a structure of frames corresponding to Step 54 shown in FIG. 7. "H-1" and "H-3", whose difference therebetween is small, are assigned to the time slots in which relative timings in different frames coincide. As a result, when the time slot where "H-1" is assigned is combined with the time slot where "H-3" is assigned, the thus combined time slots are equivalent to the time slot of full frame.

Figure 9:
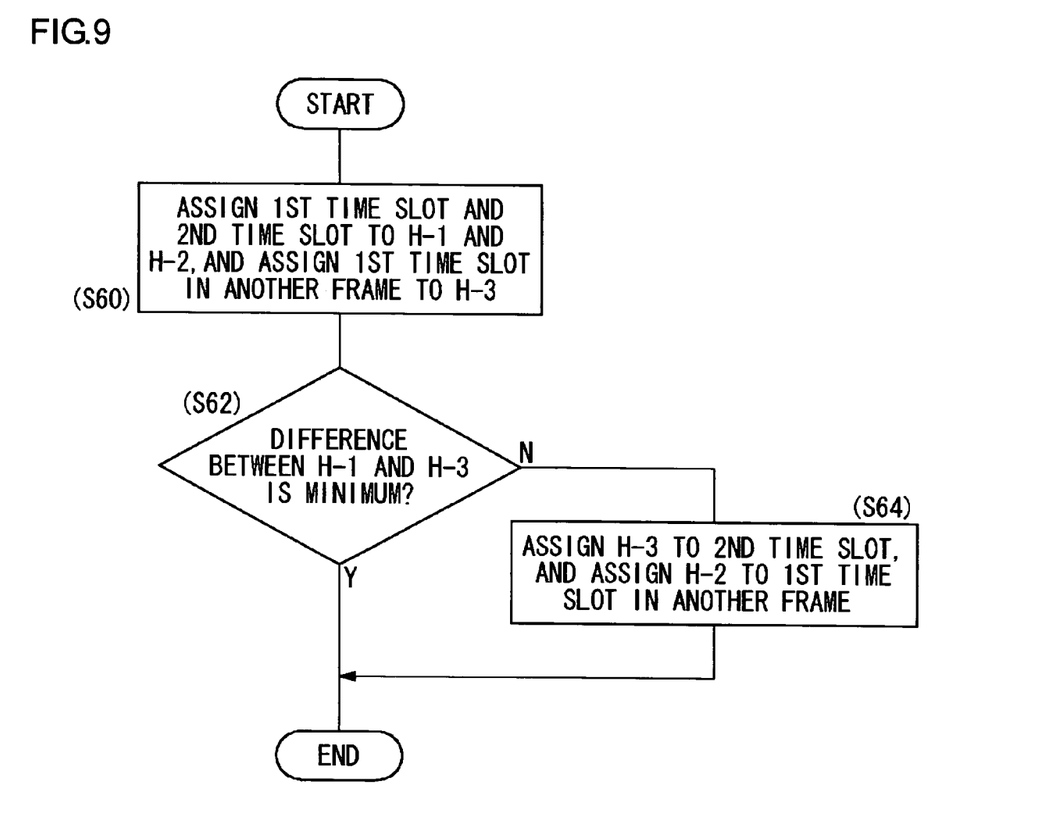
FIG. 9 is a flowchart showing still another procedure of assigning time slots by the control unit of FIG. 1.

FIG. 9 is a flowchart showing still another procedure for assigning time slots by the control unit 30. In this case, time slots have already been allotted to "H-1" to "H-3" at the initial condition, and this corresponds to reassignment of time slots. The control unit 30 assigns the first time slot and the second time slot to "H-1" and "H-2", respectively, and assigns the first time slot in another frame to "H-3" (S60). "H-1" and "H-3" are assigned to time slot where timings in different frames coincide. As a result, when the time slot where "H-1" is assigned is combined with the time slot where "H-3" is assigned, the thus combined time slots are equivalent to the time slot of full frame.

If the difference in signal strength between "H-1" and "H-3" is minimum (Y of S62), the control unit 30 keeps the situation intact. If, on the other hand, the difference in signal strength between "H-1" and "H-3" is not minimum (N of S62), the control unit 30 assigns "H-3" to the second time slot and assigns "H-2" to the first slot in another frame (S64). That is, "H-1" and "H-3" are assigned to time slots where timings in different frames coincide, by replacing "H-2" with "H-3".

According to the preferred embodiment of the present invention, time slots in which timings coincide in different frames are assigned to half-rate terminal apparatuses for which the difference in signal strength is small. Therefore, even when another full-rate terminal apparatus is assigned by spatial multiplexing to these time slots, the effects produced by the respective half-rate terminals on the full-rate terminal apparatus can be made equal to each other. Because of the equal effects on the full-rate terminal apparatus, a small effect from one half-rate terminal apparatus makes the effect from the other half-rate terminal apparatus small also, thus reducing the deterioration of the transmission quality at the full-rate terminal apparatus. Since a full-rate terminal apparatus can be assigned by spatial multiplexing to the time slots to which these half-rate terminal apparatuses are assigned, the frequency utilization efficiency can be improved. Furthermore, the deterioration of the transmission quality by SDMA can be reduced. The indicator for the assigning of a time slot, which is signal strength, can be derived easily. Moreover, since the signal strength can be derived in a short period of time, a time slot can be assigned in a short period of time also.

A new half-rate terminal apparatus is assigned to a time slot in a different frame which provides an identical timing to the time slot to which an existing half-rate terminal apparatus with a smaller difference in signal strength from the new half-rate terminal apparatus is assigned. Therefore, the signal strengths of these terminal apparatuses get closer to each other, and thus the effects produced by the respective half-rate terminal apparatuses on a full-rate terminal apparatus can be made equal even when the full-rate terminal apparatus is assigned by spatial multiplexing to these time slots. Furthermore, the reassignment of time slots is done such that time slots with an identical timing in different frames are assigned respectively to the existing half-rate terminal apparatuses with a smaller difference in signal strength. Therefore, even when a full-rate terminal apparatus is assigned by spatial multiplexing to these time slots, the effects on the full-rate terminal apparatus can be made equal.

Where the difference in signal strength is small between any of the existing half-rate terminal apparatuses and a new half-rate terminal apparatus, the reassignment of time slots is done such that the time slots with an identical timing in different frames are assigned to these terminal apparatuses, respectively. Therefore, even when a full-rate terminal apparatus is assigned by spatial multiplexing to these time slots, the effects of the respective half-rate terminal apparatuses on the full-rate terminal apparatus can be made equal. And even when there is some variation in the signal strength, the assignment of time slots accordingly can be carried out. Moreover, the deterioration of transmission quality due to the variation in signal strength can be reduced.

The present invention has been described based on the embodiments which are only exemplary. It is therefore understood by those skilled in the art that other various modifications to the combination of each component and process are possible and that such modifications are also within the scope of the present invention.

In the preferred embodiment according to the present invention, the derivation 28 measures the signal strength as the radio communication quality. However, the present invention is not limited thereto and, for example, the derivation unit 28 may derive receiving response vectors corresponding respectively to a plurality of terminal apparatuses as the radio communication quality, based on signals received from the plurality of terminal apparatuses. In such a case, the processing unit 22 includes a receiving response vector computing unit for computing receiving response vectors. The receiving response vector computing unit derives, by correlation processing, from the radio-unit-side signal 200 and reference signal. In so doing it is assumed that the radio-unit-side signal 200 and reference signal are inputted not only from the first processing unit 22a but also from the second processing unit 22b and the like. If a radio-unit-side signal 200 in the first processing unit 22a is denoted by $x_1(t)$, a radio-unit-side signal 200 in the second processing unit 22b by $x_2(t)$, a reference signal in the first processing unit by $S_1(t)$ and a reference signal in the second processing unit by $S_2(t)$, then $x_1(t)$ and $x_2(t)$ will be expressed by the following Equation (1):

$$x_1(t) = h_{11}S_1(t) + h_{21}S_2(t)$$
$$x_2(t) = h_{12}S_1(t) + h_{22}S_2(t) \quad (1)$$

The noise is ignored here. A first correlation matrix $R_1$, with E as an ensemble average, is expressed by the following Equation (2):

$$R_1 = \begin{bmatrix} E[x_1 S_1^*] & E[x_1 S_2^*] \\ E[x_2 S_1^*] & E[x_2 S_2^*] \end{bmatrix} \quad (2)$$

A second correlation matrix $R_2$ among the reference signals is given by the following Equation (3):

$$R_2 = \begin{bmatrix} E[S_1 S_1^*] & E[S_1 S_2^*] \\ E[S_2 S_1^*] & E[S_2 S_2^*] \end{bmatrix} \quad (3)$$

Finally, the first correlation matrix $R_1$ is multiplied by the inverse matrix of the second correlation matrix $R_2$ so as to derive a receiving response vector, which is expressed by the following Equation (4):

$$\begin{bmatrix} h_{11} & h_{21} \\ h_{12} & h_{22} \end{bmatrix} = R_1 R_2^{-1} \quad (4)$$

In such a case, the control unit 30 carries out the processing of the aforementioned time slot assignment based on the difference in receiving response vector instead of the difference in signal strength. According to this modification, time slots in different frames which provides identical timings is assigned to a half-rate terminal apparatus with a smaller difference in receiving response vector. Therefore, the effects thereof on a full-rate terminal apparatus can be made equal even when the full-rate terminal apparatus is assigned by spatial multiplexing to these time slots. Since the processing is executed based on the difference in receiving response vector, the accuracy of the processing can be raised. In other words, the assignment of time slots may be done based on the factors affecting the full-rate terminal apparatus. It is to be noted also that the receiving weight vector may be used instead of the receiving response vector.

According to an embodiment of the present invention, the control unit 30 assigns time slots to half-rate terminal apparatuses. However, the arrangement is not limited thereto; rather, the terminal apparatuses may be quarter-rate terminal apparatuses or terminal apparatuses with even lower data rates. In such a case, the control unit 30 uses a longer frame cycle for assigning the same terminal apparatus to a single time slot, for instance, a first time slot. That is, one time slot is assigned every four frames to a quarter-rate terminal apparatus. It is to be noted here that a full-rate terminal apparatus in the preferred embodiment may be a half-rate terminal apparatus so long as the data rate thereof is higher than that of a terminal apparatus to be assigned. According to this modification, the present invention can be applied to terminal apparatuses with various data rates. That is, such an arrangement works if the terminal apparatus with a different data rate is ready for spatial multiplexing.

In the present embodiments according to the present invention, the receiving weight vector computing unit 68 uses LMS algorithm as an adaptive algorithm for estimating receiving weight vector signals. However, algorithms other than the LMS algorithm may be used in the receiving weight vector computing unit 68. For instance, RLS algorithm may be used. According to this modification, the convergence of a receiving weight vector signal will be faster. That is, it suffices as long as SDMA is performed.

In the present embodiments according to the present invention, the control unit 30 performs the assignment of time slots, at predetermined timings, based on the signal strength. However, the present invention is not limited thereto and, for example, the control unit 30 may perform the assignment of time slots based on values obtained after the signal strength has undergone a statistical processing. Here, an example of the statistical processing is averaging. According to this modification, the effect such as noise can be reduced and the processing accuracy can be raised. That is, it suffices if the assignment of time slots is performed based on factors affecting a full-rate terminal apparatus.

While the preferred embodiments of the present invention have been described using specific terms, such description is for illustrative purposes only, and it is to be understood that changes and variations may be made without departing from the spirit or scope of the appended claims.

What is claimed is:

1. A base station apparatus, comprising:
   a communication unit which communicates respectively with a plurality of terminal apparatuses by a plurality of time slots contained in each of frames arranged contiguously;
   a derivation unit which derives radio communication qualities among the base station apparatus and the plurality of terminal apparatuses, respectively; and
   an assignment unit which assigns time slots in the plurality of terminal apparatuses, respectively, in such a manner as to assign time slots, contained respectively in different frames among the contiguously arranged frames, in which relative timings in the frames coincide, to at least two terminal apparatuses, whose difference in radio communication quality therebetween is small, among the plurality of terminal apparatuses.

2. The base station apparatus according to claim 1, wherein as the radio communication quality said derivation unit derives the strength of signals received respectively from the plurality of terminal apparatuses.

3. The base station apparatus according to claim 1, wherein as the radio communication quality said derivation unit derives receiving response vectors corresponding respectively to the plurality of terminal apparatuses, based on signals received respectively from the plurality of terminal apparatuses.

4. The base station apparatus according to claim 1, wherein, in a case where at least two time slots contained in one frame are assigned respectively to at least two existing terminal apparatuses and new time slots are assigned to a new terminal apparatus,
said assignment unit includes:
means for selecting an existing terminal apparatus whose difference in radio communication quality between the existing terminal and the new terminal apparatus is smaller, from among the at least two existing terminal apparatuses; and
means for assigning the time slots, in which relative timings in the frames coincide, to the time slots assigned in the selected existing terminal apparatuses when time slots contained in a frame different from said frame are assigned to the new terminal apparatus.

5. The base station apparatus according to claim 1, wherein, in a case where at least two time slots contained in one frame are assigned respectively to at least two existing terminal apparatuses and new time slots are assigned to a new terminal apparatus,
if a difference in radio communication quality between the at least two existing terminal apparatuses is smaller than a difference in radio communication quality between the at least two existing terminal apparatuses and the new terminal apparatus, said assignment unit assigns the time slots, contained respectively in different frames, in which relative timings in the frames coincide, to the at least two existing terminal apparatuses and assigns a time slot in a frame that contains time slots assigned to any of the at least two existing terminal apparatuses, to the new terminal apparatus.

6. The base station apparatus according to claim 1, wherein, in a case where time slots, contained respectively in different frames, in which relative timings in the frames coincide, are assigned respectively to at least two existing terminal apparatuses and new time slots are assigned to a new terminal apparatus,
if a difference in radio communication quality between any of the at least two existing terminal apparatuses and the new terminal apparatus is smaller than a difference in radio communication quality between the at least two existing terminal apparatuses, said assignment unit assigns the time slots, contained respectively in different frames, in which relative timings in the frames coincide, to any of the at least two existing terminal apparatuses and the new terminal apparatus.

7. The base station apparatus according to claim 1, wherein based on the radio communication quality said assignment unit reassigns the time slots at a predetermined timing.

8. A method for assigning time slots, including:
communicating respectively with a plurality of terminal apparatuses by a plurality of time slots contained in each of frames arranged contiguously;
deriving radio communication qualities among the plurality of terminal apparatuses, respectively; and
assigning time slots to the plurality of terminal apparatuses, respectively, in such a manner as to assign time slots, contained respectively in different frames among the contiguously arranged frames, in which relative timings in the frames coincide, to at least two terminal apparatuses, whose difference in radio communication quality is small, among the plurality of terminal apparatuses.

9. The method according to claim 8, wherein said deriving is such that the strength of signals received respectively from a plurality of terminal apparatuses is derived as the radio communication quality.

10. The method according to claim 8, wherein said deriving is such that, as the radio communication quality, receiving response vectors corresponding respectively to a plurality of terminal apparatuses are derived based on signals received respectively from the plurality of terminal apparatuses.

11. The method according to claim 8, wherein, in a case where at least two time slots contained in one frame are assigned respectively to at least two existing terminal apparatuses and new time slots are assigned to a new terminal apparatus,
said assigning is such that an existing terminal apparatus whose difference in radio communication quality between the existing terminal and the new terminal apparatus is smaller is selected from among the at least two existing terminal apparatuses, and the time slots, in which relative timings in the frame coincide, are assigned to the time slots assigned in the selected existing terminal apparatuses when time slots contained in a frame different from said frame are assigned to the new terminal apparatus.

12. The method according to claim 8, wherein, in a case where at least two time slots contained in one frame are assigned respectively to at least two existing terminal apparatuses and new time slots are assigned to a new terminal apparatus,
if a difference in radio communication quality between the at least two existing terminal apparatuses is smaller than a difference in radio communication quality between the at least two existing terminal apparatuses and the new terminal apparatus, said assigning is such that the time slots, contained respectively in different frames, in which relative timings in the frames coincide, are assigned to the at least two existing terminal apparatuses and a time slot in a frame that contains time slots assigned to any of the at least two existing terminal apparatuses is assigned to the new terminal apparatus.

13. The method according to claim 8, wherein, in a case where time slots, contained respectively in different frames, in which relative timings in the frames coincide, are assigned respectively to at least two existing terminal apparatuses and new time slots are assigned to a new terminal apparatus,
if a difference in radio communication quality between any of the at least two existing terminal apparatuses and the new terminal apparatus is smaller than a difference in radio communication quality between the at least two existing terminal apparatuses, the assigning is such that the time slots, contained respectively in different frames, in which relative timings in the frames coincide, are assigned to any of the at least two existing terminal apparatuses and the new terminal apparatus.

* * * * *